(12) United States Patent
Eason et al.

(10) Patent No.: US 11,264,868 B2
(45) Date of Patent: Mar. 1, 2022

(54) MOTOR COOLING FAN

(71) Applicant: Nidec Motor Corporation, St. Louis, MO (US)

(72) Inventors: Richard L. Eason, Ballwin, MO (US); Chetan O. Modi, Valley Park, MO (US); Kevin L. West, Belleville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 16/864,461

(22) Filed: May 1, 2020

(65) Prior Publication Data
US 2021/0344253 A1    Nov. 4, 2021

(51) Int. Cl.
| | | |
|---|---|---|
| H02K 9/06 | (2006.01) | |
| H02K 5/15 | (2006.01) | |
| H02K 1/22 | (2006.01) | |
| F04D 25/08 | (2006.01) | |

(52) U.S. Cl.
CPC .............. *H02K 9/06* (2013.01); *H02K 1/223* (2013.01); *H02K 5/15* (2013.01); *F04D 25/082* (2013.01)

(58) Field of Classification Search
CPC . H02K 9/06; H02K 1/223; H02K 5/15; F04D 25/082
See application file for complete search history.

(56) References Cited

U.S. PATENT DOCUMENTS

| | | | | |
|---|---|---|---|---|
| 5,693,992 | A * | 12/1997 | Kurusu | F04D 29/282 |
| | | | | 310/63 |
| 7,168,923 | B2 * | 1/2007 | Vasilescu | F04D 29/023 |
| | | | | 310/43 |
| 7,365,471 | B2 * | 4/2008 | Creviston | H02K 9/06 |
| | | | | 310/263 |
| 2006/0076845 | A1 * | 4/2006 | Park | H02K 1/30 |
| | | | | 310/91 |
| 2007/0236098 | A1 * | 10/2007 | Kusase | H02K 9/06 |
| | | | | 310/263 |
| 2009/0085417 | A1 * | 4/2009 | Vasilescu | F04D 29/667 |
| | | | | 310/62 |
| 2010/0133933 | A1 * | 6/2010 | Ikaheimo | H02K 9/10 |
| | | | | 310/62 |
| 2017/0346367 | A1 * | 11/2017 | Hashimoto | H02K 1/243 |
| 2018/0375406 | A1 * | 12/2018 | Healey | H02K 5/1735 |

* cited by examiner

*Primary Examiner* — Naishadh N Desai
(74) *Attorney, Agent, or Firm* — Hovey Williams LLP

(57) ABSTRACT

An electric motor assembly includes a stator, rotor, housing, rotatable shaft, and cooling fan. The stator and rotor are at least partly housed in the housing. The shaft is associated with the rotor to rotate about an axis. The cooling fan is fixed to and thereby rotates with the shaft to induce airflow within the housing. The cooling fan includes a wheel plate projecting radially relative to the shaft. The cooling fan further includes a plurality of radial blades that project axially from the wheel plate. The blades define a series of radial channels. The wheel plate defines an axial plate opening therethrough in alignment with a respective one of the channels.

19 Claims, 13 Drawing Sheets

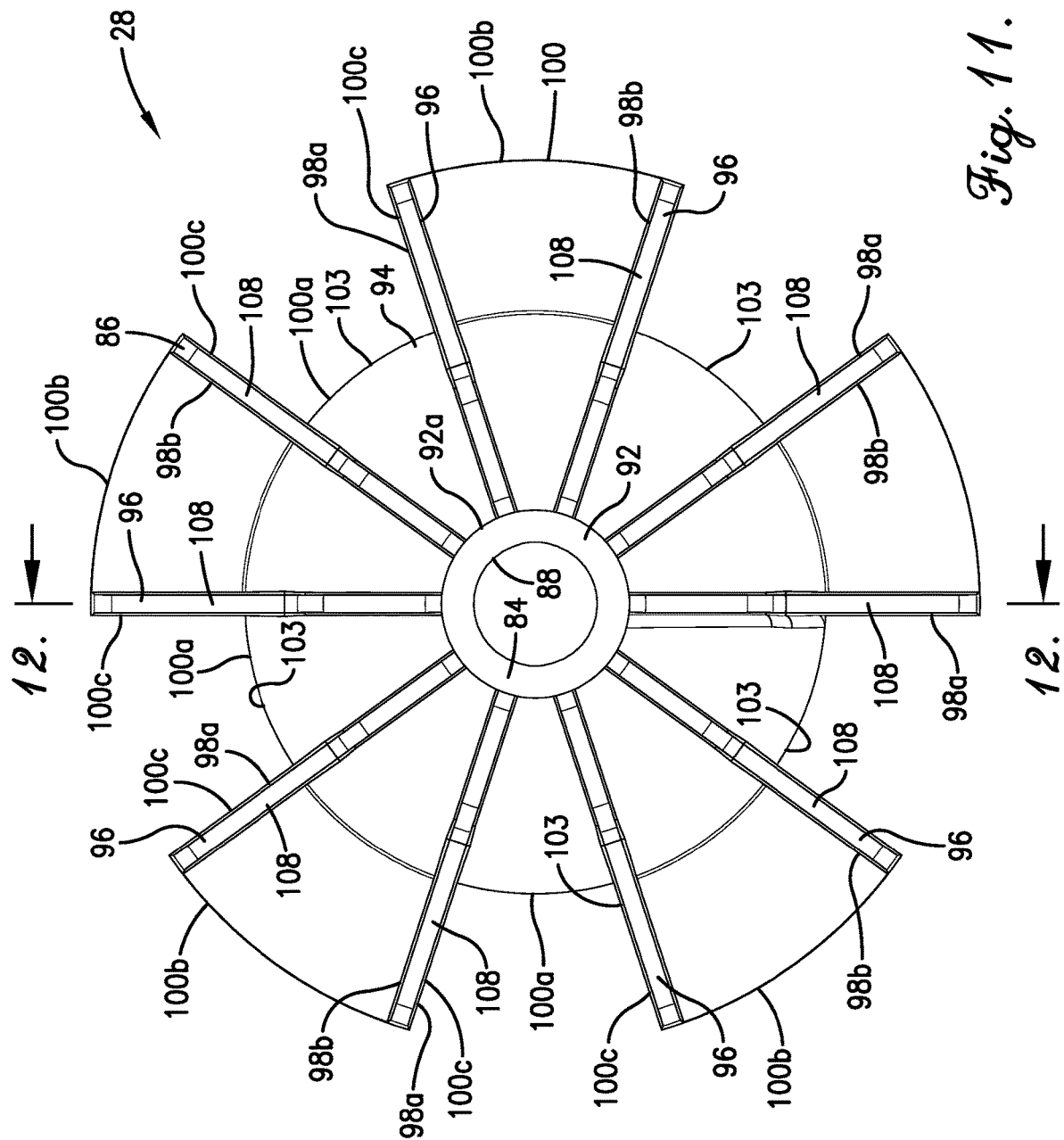

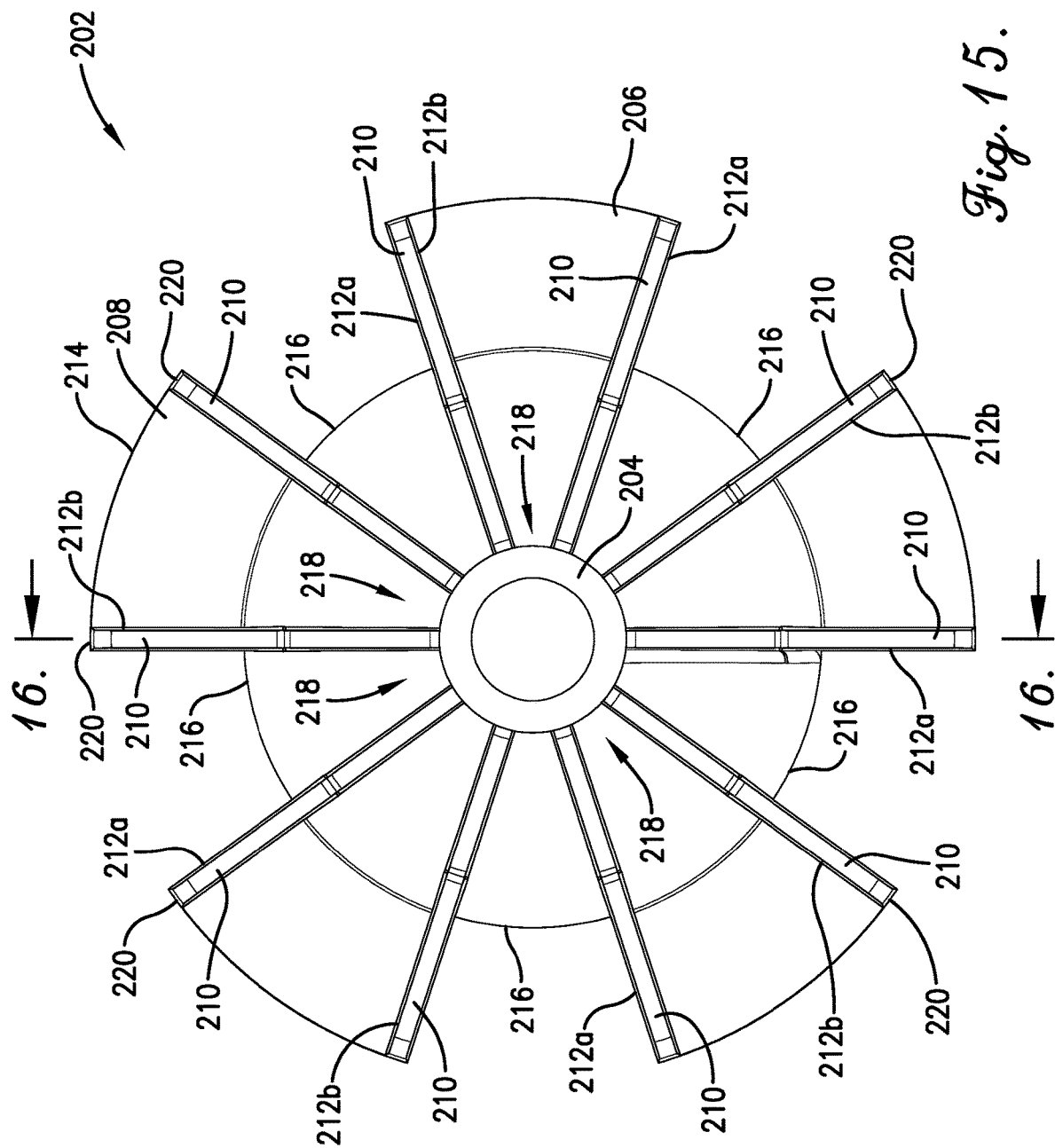

MOTOR COOLING FAN

BACKGROUND

1. Field

The present invention relates generally to electric motors. More specifically, embodiments of the present invention concern a motor with an internally housed cooling fan.

2. Discussion of Prior Art

Conventional electric motors are commonly provided with an enclosed motor housing to restrict ingress of liquid and other foreign materials. In the customary manner, the housing receives and encloses a stator and rotor, and these components generate heat during normal motor operation. Many such motors also include electronics to control motor operation. The motor control electronics are also commonly contained in the housing and also generate heat.

Prior art electric motors with enclosed housings are known to retain excessive amounts of heat. Those of ordinary skill in the art will appreciate that excessive heat adversely affects the thermal stability of the motor. To the extent that control electronics are also contained in the housing, excessive heat impacts the operation of the electronics and can damage the electronics.

It is also known for prior art motors to include a cooling fan mounted on the rotor shaft (see FIGS. 1-6). Known cooling fans generally develop air flow within the housing to facilitate heat transfer away from internal components. Although the depicted prior art cooling fan generates some air flow within the housing, the illustrated configuration produces inadequate air flow, which undesirably limits the transfer of heat.

SUMMARY

The following brief summary is provided to indicate the nature of the subject matter disclosed herein. While certain aspects of the present invention are described below, the summary is not intended to limit the scope of the present invention.

Embodiments of the present invention provide a motor cooling fan that does not suffer from the problems and limitations of prior art devices, including those devices set forth above.

An aspect of the present invention concerns an electric motor assembly that broadly includes a stator, rotor, housing, rotatable shaft, and cooling fan. The rotor is rotatable relative to the stator. The stator and rotor are at least partly housed in the housing. The shaft is associated with the rotor to rotate about an axis. The cooling fan is within the housing. The cooling fan is fixed to and thereby rotates with the shaft to induce airflow within the housing. The cooling fan includes a wheel plate projecting radially relative to the shaft. The cooling fan also includes a plurality of radial blades that project axially from the wheel plate. The blades define a series of radial channels. The wheel plate defines an axial plate opening therethrough in alignment with a respective one of the channels.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 11 is a front elevation of the cooling fan shown in FIGS. 7-10;

FIG. 15 is a front elevation of the cooling fan shown in FIGS. 13 and 14; and

Figure 1:
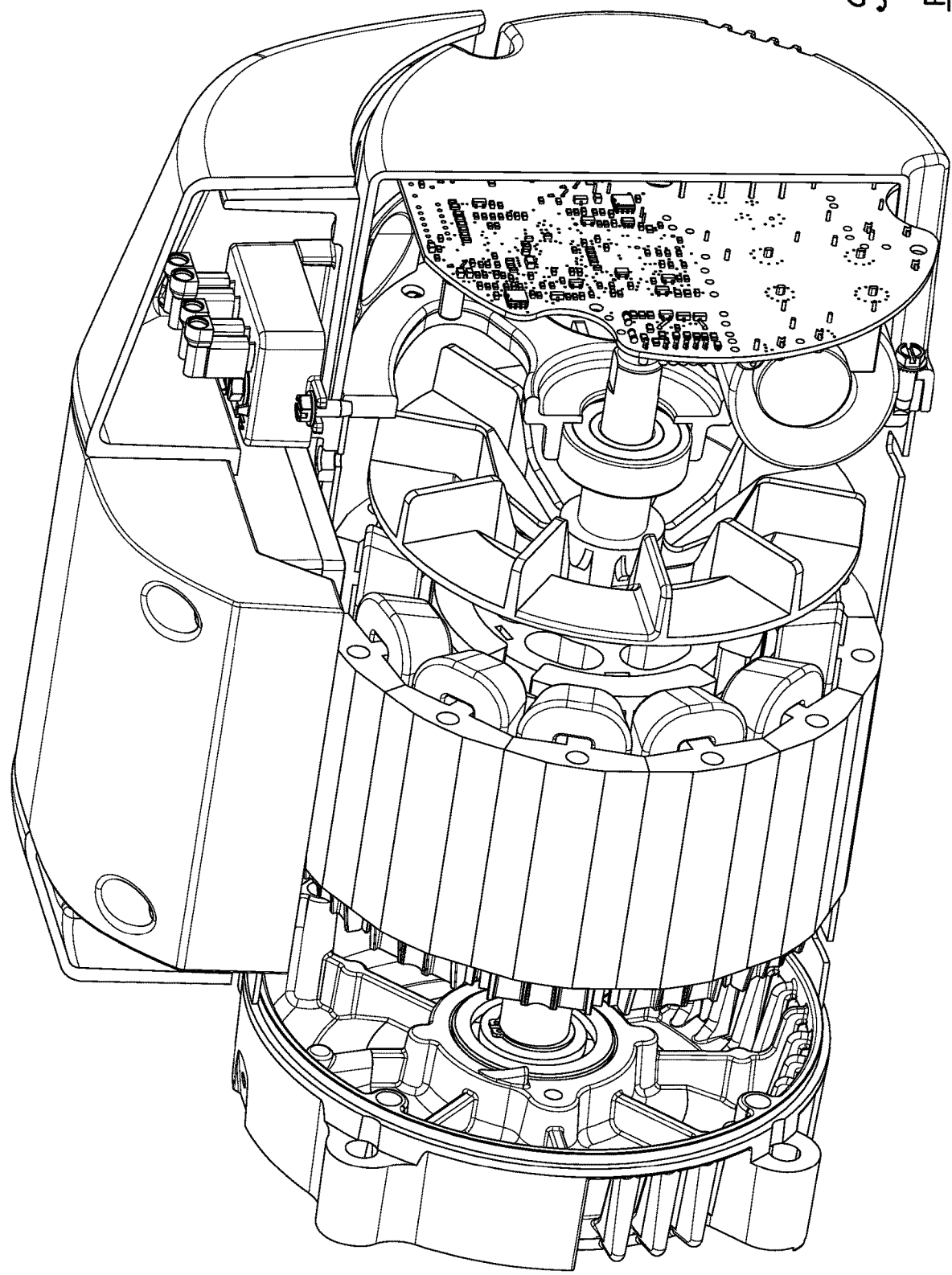
FIG. 1 is a fragmentary front perspective of a prior art electric motor with a conventional cooling fan.
Figure 2:
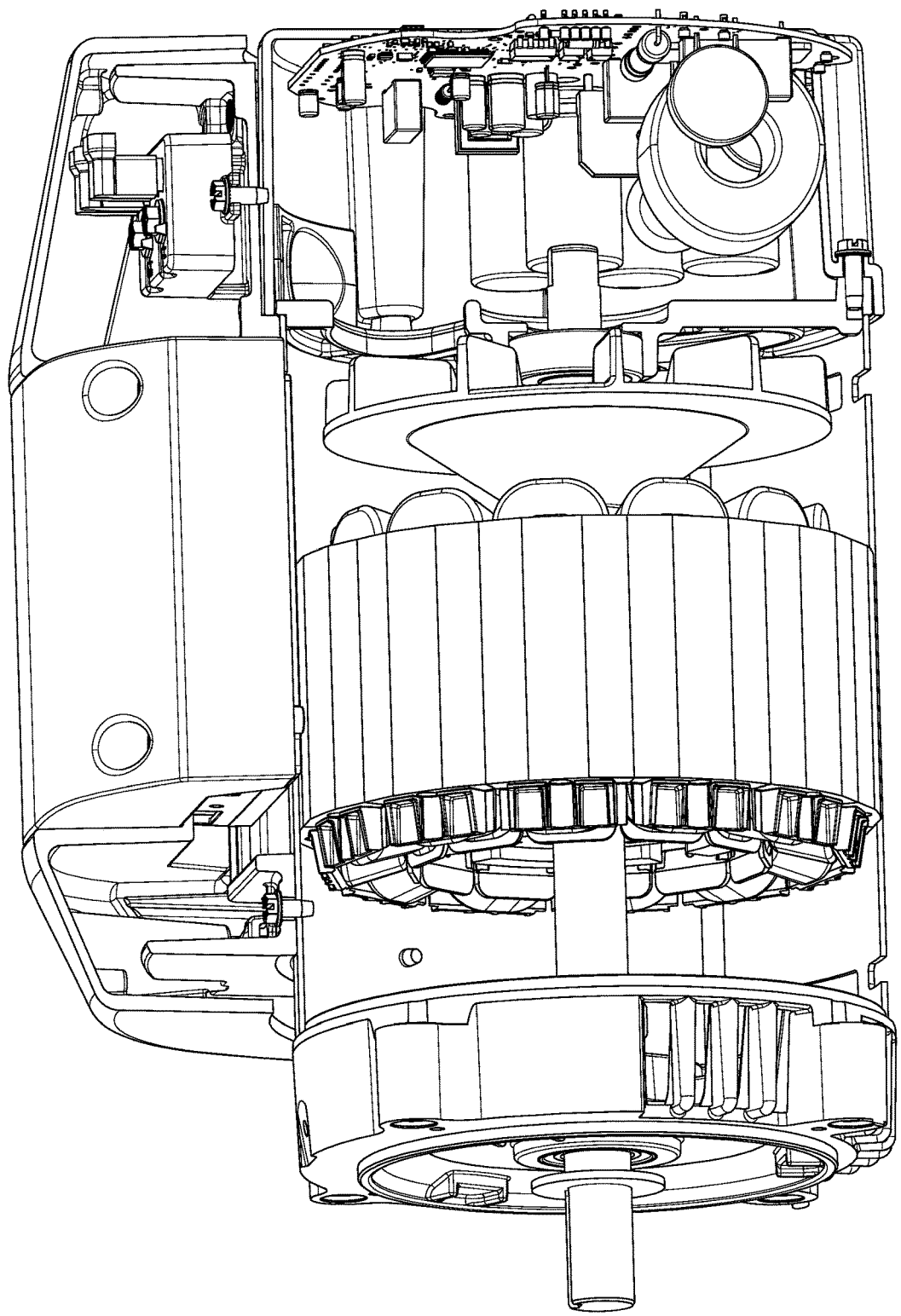
FIG. 2 is a fragmentary side perspective of the electric motor similar to FIG. 1, but showing the opposite side of the cooling fan.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 7:
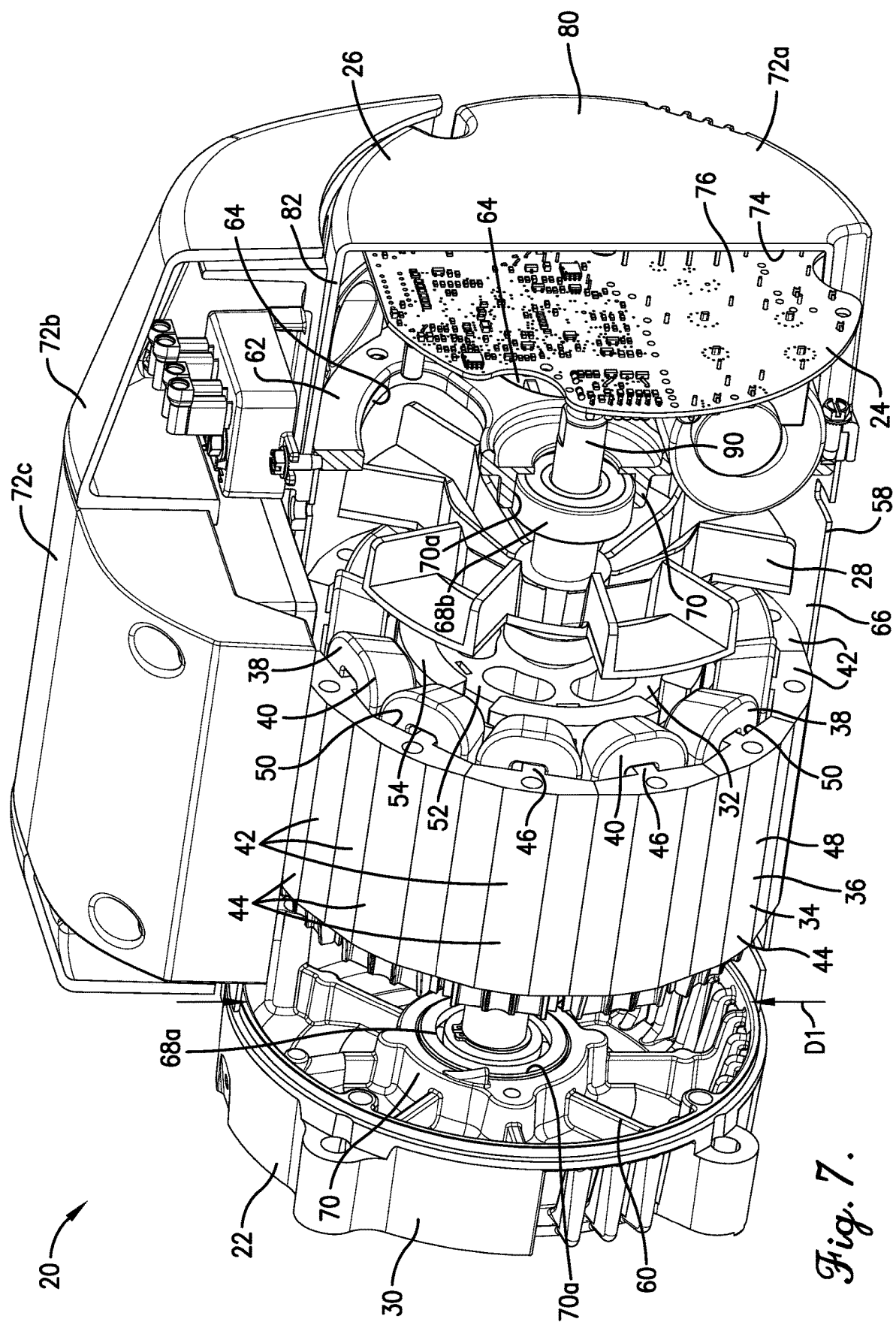
FIG. 7 is a fragmentary front perspective of an electric motor assembly constructed in accordance with a first preferred embodiment of the present invention, with the assembly including an electric motor and a cooling fan, and showing a housing, a stator, and a rotor of the electric motor.
Figure 8:
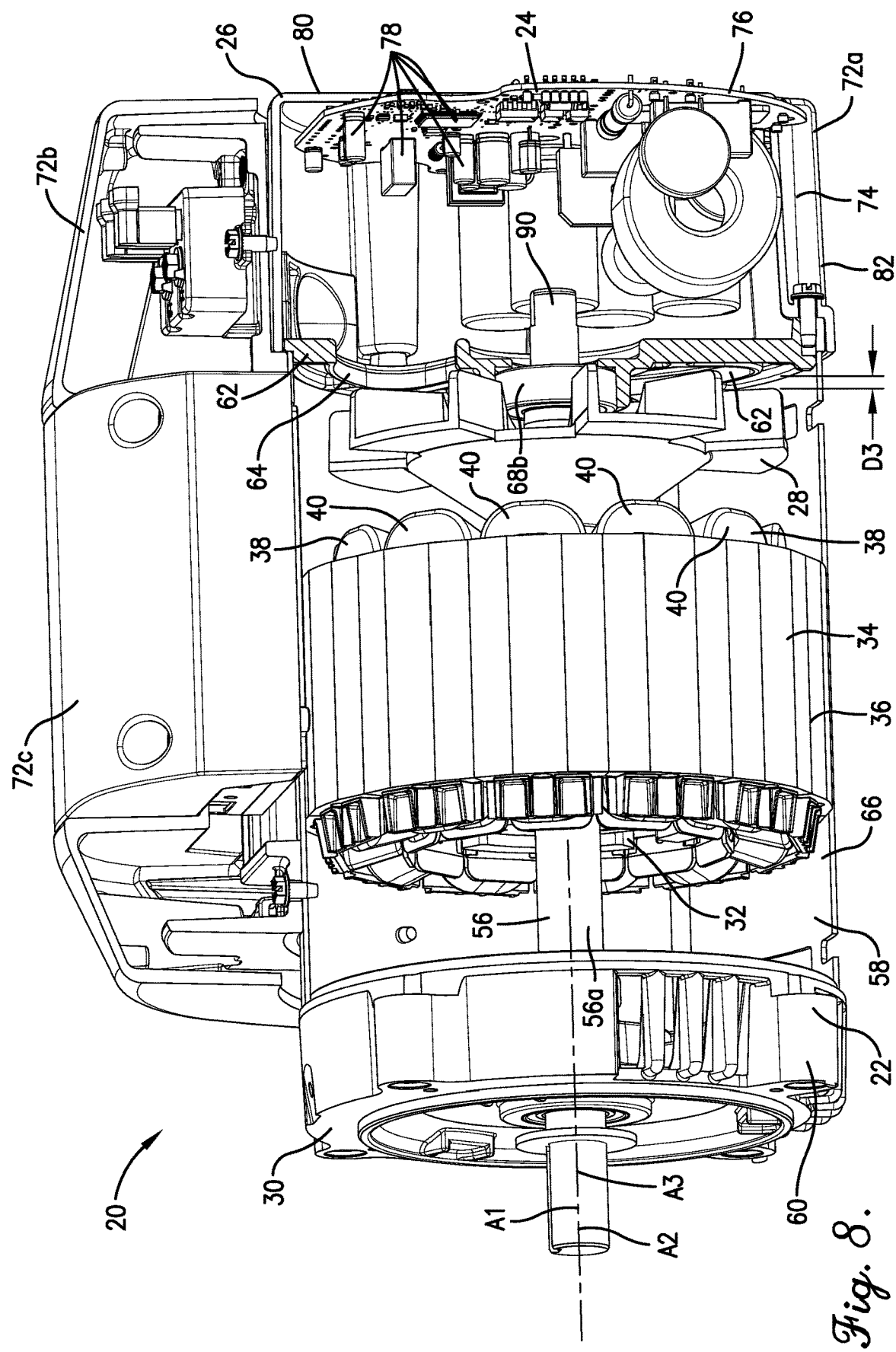
FIG. 8 is a fragmentary side perspective of the electric motor assembly similar to FIG. 7, showing the cooling fan operably positioned in the housing and mounted on a rotor shaft.

Turning initially to FIGS. 7 and 8, an electric motor assembly 20 is constructed in accordance with a preferred embodiment of the present invention. The motor assembly 20 is particularly configured for extended service in humid environments. The motor assembly 20 broadly includes an electric motor 22, a controller 24, a controller housing 26, and a cooling fan 28.

In the usual manner, the motor assembly 20 is mounted for operation using a support structure (not shown). The support structure serves to support the weight of the motor assembly 20. At the same time, the support structure can minimize transmission of external loads and vibration between the motor assembly and other structural components. For instance, the support structure can include one or more elastomeric elements to isolate the motor assembly from various loads.

The electric motor 22 is configured for use in any suitable environment, such as a powered machine. The illustrated motor assembly 20 is particularly suitable for use with a pool pump. The motor 22 broadly includes a motor housing 30, a rotor 32 (see FIG. 7), and a stator 34. The rotor 32 is preferably rotatable about a rotor axis A1 (see FIG. 8). In a preferred embodiment, the stator 34 at least substantially circumscribes the rotor 32, such that the motor 22 is an inner rotor motor. It is permissible according to some aspects of the present invention, however, for the motor to be an outer rotor motor or dual rotor motor.

The stator 34 preferably includes a generally toroidal stator core 36 and wiring 38 wound about the stator core 36 to form a plurality of coils 40. The stator core 36 is preferably a laminated stator core comprising a plurality of stacked laminations (not shown), although it is permissible for the stator core to be non-laminated. The stator core 36 preferably comprises a ferromagnetic material such as steel, although use of any one or more electrically conductive materials is permissible without departing from the scope of the present invention.

The stator core 36 preferably defines a stator axis A2 (see FIG. 8). Most preferably, the axis A2 is co-axial with the axis A1 of the rotor 32, although offset or skewed axes are permissible according to some aspects of the present invention.

Preferably, the stator core 36 includes a plurality of arcuately spaced apart, generally radially extending teeth 42. More particularly, in a preferred embodiment, each of the teeth 42 includes a generally circumferentially extending yoke 44, a generally radial arm 46 extending from the yoke 44, and a crown (not shown) extending generally circumferentially from the arm 46 (see FIG. 7).

The motor 22 is preferably an inner rotor motor, with the stator 34 at least substantially circumscribing the rotor 32. More particularly, each yoke 44 preferably engages a pair of adjacent yokes 44, such that the yokes 44 cooperatively present an outer circumferential stator core face 48. The crowns cooperatively present an inner circumferential stator core face that faces the rotor 32. A circumferentially extending radial gap is preferably formed between the inner circumferential stator core face and the rotor 32. As noted, use of an outer rotor motor or dual rotor motor is permissible according to some aspects of the present invention, however.

Furthermore, it is permissible according to some aspects of the present invention for the stator core to be alternatively configured. Among other things, for instance, the stator core could comprise a plurality of interconnected multi-tooth segments, comprise one or more helically wound laminations, or comprise stacked annular laminations each formed from a single punched strip.

The coils 40 are preferably wound about the arms 46 of the teeth 42. More particularly, a slot 50 is defined between each adjacent pair of teeth 42 (see FIG. 7). The coils 40 are preferably wound about the teeth 42 and through the slots 50 so as to circumscribe respective ones of the arms 46.

The stator 34 preferably includes twelve (12) teeth 42 defining twelve (12) slots 50 therebetween, with twelve (12) coils 40 being wound about the teeth 42. Alternate numbers of teeth, slots, and/or coils are permissible according to some aspects of the present invention, however.

The wiring 38 forming the coils 40 is preferably electrically conductive wiring wound multiple times about each tooth 42 to form a plurality of turns or loops. The wiring 38 is preferably formed of copper or aluminum, although any one or more of a variety of electrical conductive materials or a combination thereof may be used within the ambit of the present invention. Furthermore, the wiring 38 may be coated or uncoated. As is customary, the wiring 38 is wound around the teeth 42 in a particular manner according to the configuration and desired performance characteristics of the motor assembly 20.

Figure 4:
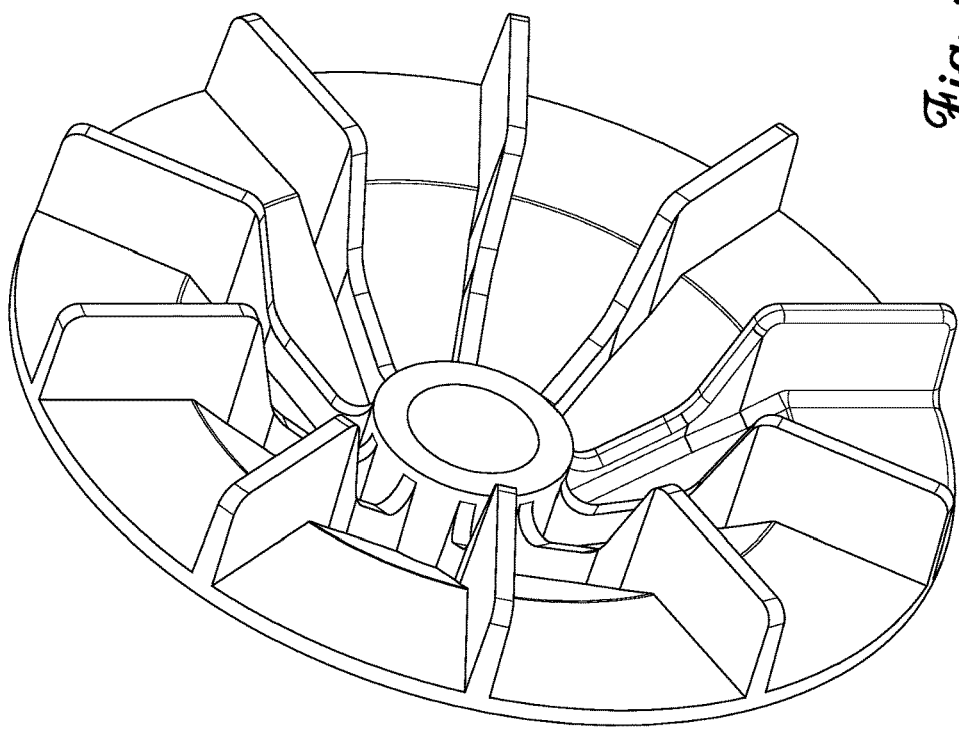
FIG. 4 is a perspective of the prior art cooling fan similar to FIG. 3, but taken from the opposite side.
Figure 3:
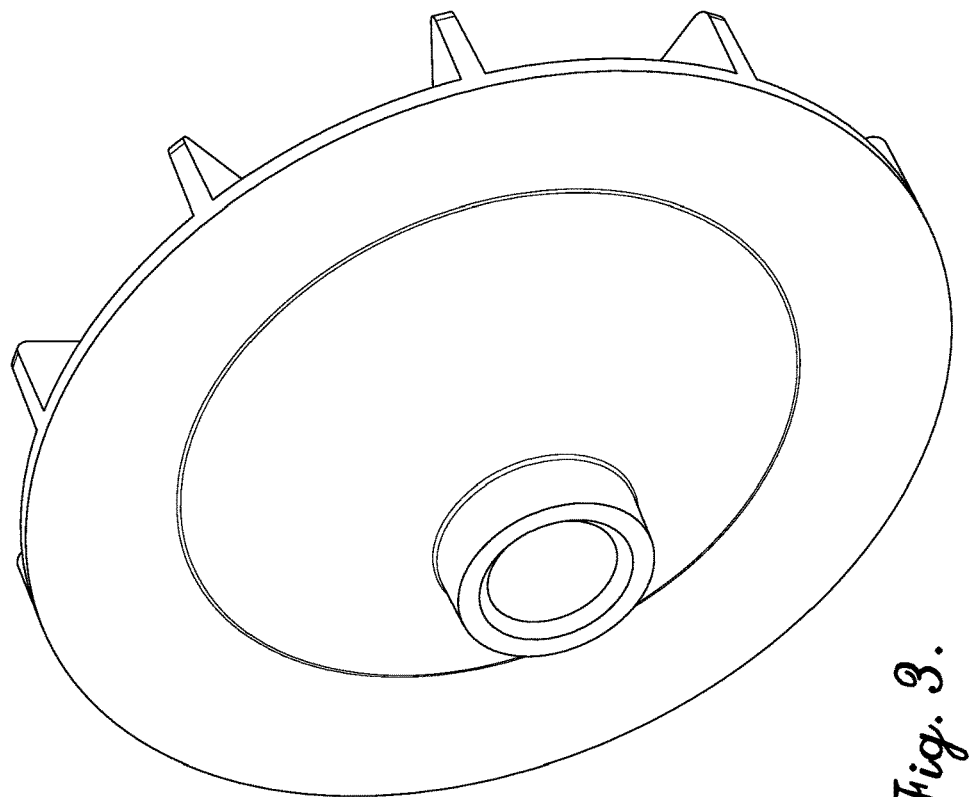
FIG. 3 is a perspective of the prior art cooling fan shown in FIGS. 1 and 2.
Figure 5:
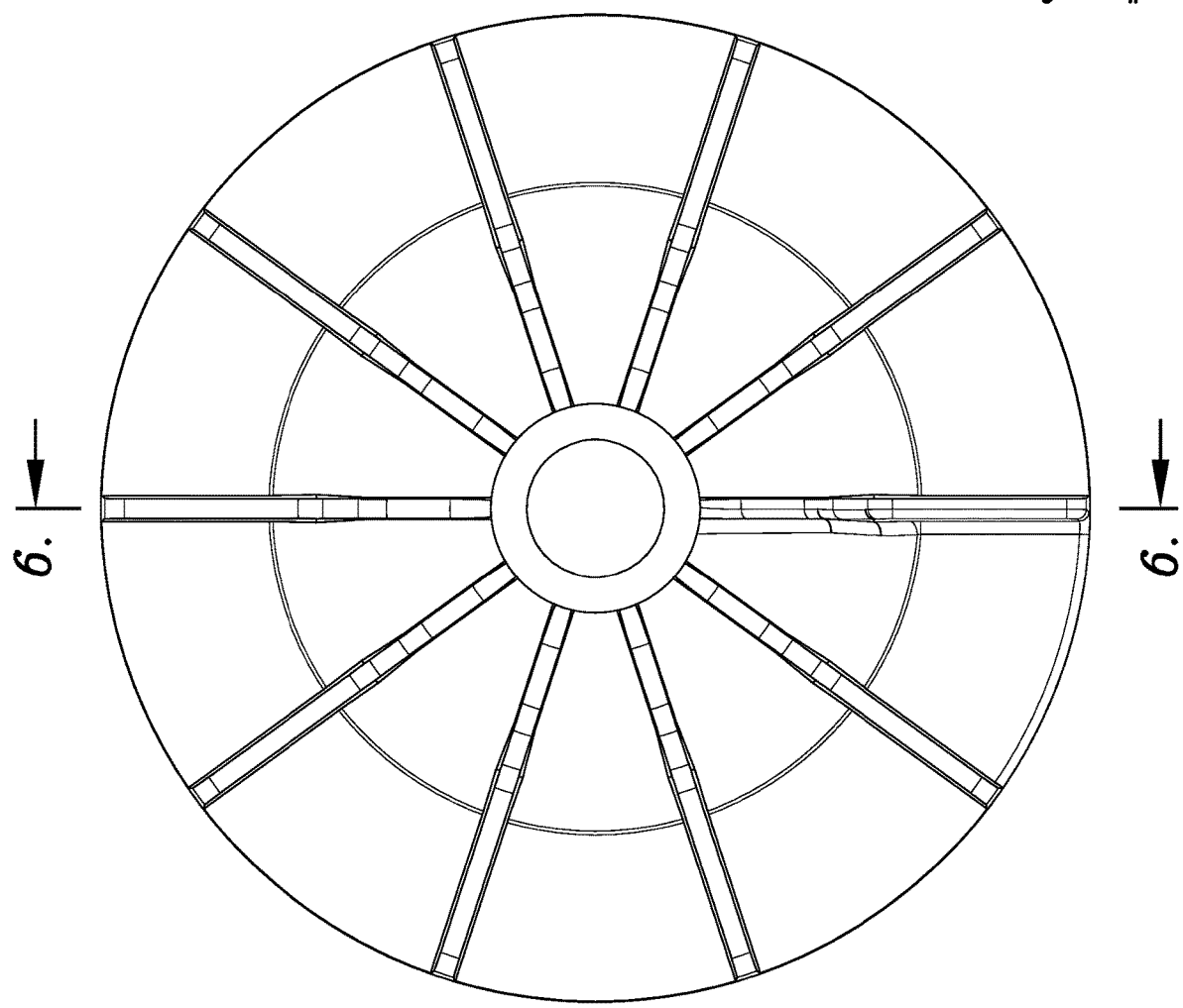
FIG. 5 is a front elevation of the prior art cooling fan shown in FIGS. 1-4.
Figure 6:
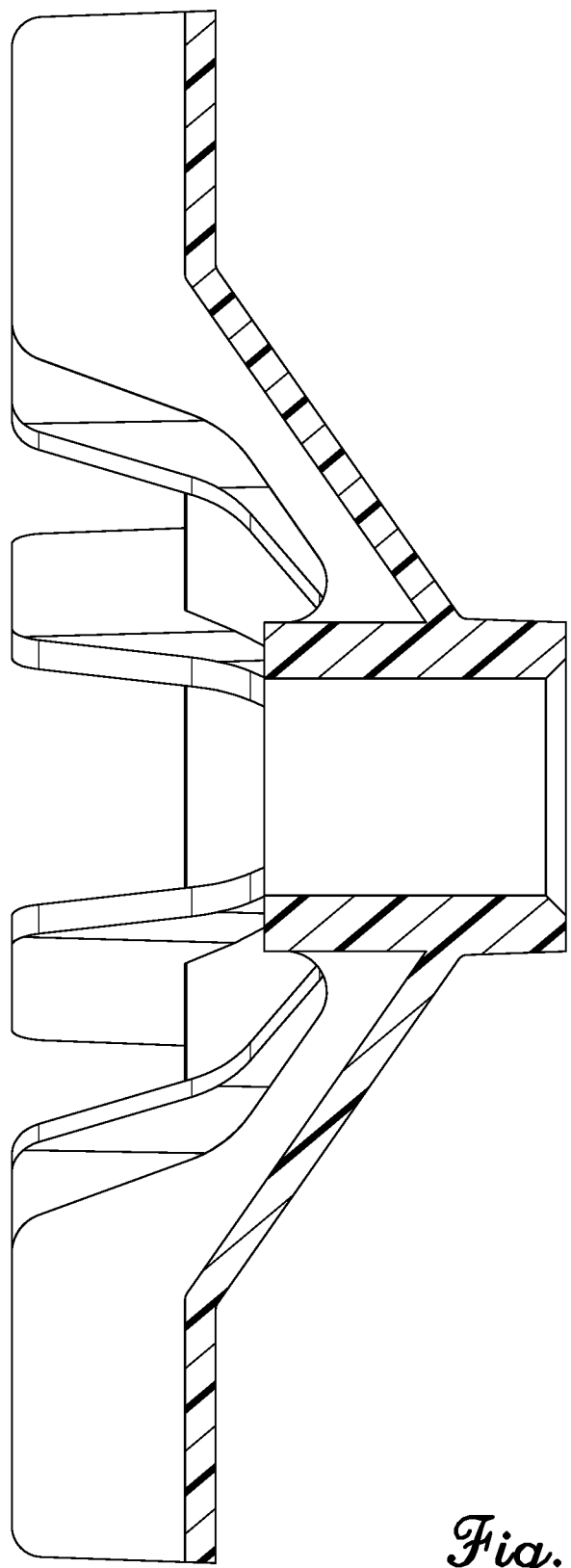
FIG. 6 is a cross section of the prior art cooling fan taken along line 6-6 in FIG. 5.

As best shown in FIGS. 4-6, the rotor 32 preferably includes a rotor core 52, a plurality of arcuately arranged magnets 54, and a shaft 56 that extends along and is rotatable about the rotor axis A1 (see FIGS. 7 and 8). The illustrated rotor core 52 is fixed to the shaft 56 and supports the magnets 54. The rotor core 52 is preferably a laminated rotor core, although it is permissible for the rotor core to be non-laminated. The laminations of the rotor core 52 are preferably interlocked, although other configurations (e.g., non-interlocked laminations) are permissible.

The rotor core 52 preferably comprises a ferromagnetic material such as steel, although use of any one or more electrically conductive materials is permissible without departing from the scope of the present invention. The rotor core 52 preferably defines a plurality of magnet-mounting faces (not shown), and various magnet-mounting configurations are permissible according to some aspects of the present invention.

The depicted shaft 56 presents a continuous outer shaft surface 56a to receive the cooling fan 28 (see FIG. 8). Preferably, the shaft 56 of the rotor 32 provides the fan-supporting shaft that directly drives the cooling fan 28. It is also within the scope of certain aspects of the present invention for a separate shaft powered by the rotor to support the fan. For instance, an offset output shaft drivingly coupled to the rotor shaft may alternatively support the fan.

Referring again to FIGS. 7 and 8, the motor housing 30 preferably includes a shell 58, a front endshield 60, and a rear endshield 62. In the usual manner, the motor housing 30 is sized and configured to receive and house the rotor 32 and stator 34. As will be explained in greater detail, the motor housing 30 is also sized and configured to receive the cooling fan 28 adjacent the rotor 32 and stator 34.

The rear endshield 62 is preferably spoked and presents endshield openings 64. The endshield openings 64 are elongated and are spaced circumferentially about the rotor axis A1. The depicted endshield openings 64 are configured so that the cooling fan 28 facilitates fluid communication between the motor housing 30 and the controller housing 26. The shell 58 and the endshields 60 and 62 preferably present an internal motor chamber 66 that at least substantially receives the cooling fan 28, rotor 32, and stator 34. The motor chamber 66 defines an internal diameter dimension D1 (see FIG. 7).

In a preferred embodiment, the shell 58 extends generally circumferentially about the stator 34. It is permissible according to some aspects of the present invention, however, for the shell to extend in such a manner as to provide one or more flat sides, in contrast to the preferred generally cylindrical form, or to be otherwise alternatively shaped.

The front endshield 60 preferably supports a front bearing 68a, and the rear endshield 62 preferably supports a rear bearing 68b. The endshields 60 and 62 are preferably secured to the shell 58 by means of fasteners.

In the illustrated embodiment, each endshield 60,62 includes a bearing housing 70 that presents a bearing pocket 70a to receive the corresponding bearing 68a,b (see FIG. 7). The rear endshield 62 also presents a shaft opening 62a, which is partly defined by the corresponding bearing pocket 70a. The front and rear bearings 68a,b preferably cooperatively rotatably support the shaft 56. However, alternative or additional bearings, supports, or shaft supports may be provided without departing from the scope of the present invention, however. Preferably, the shaft 56 projects outwardly beyond the front endshield 60 to present an exposed output end connectable to a powered component (such as a pump).

Although the illustrated cooling fan 28 is preferably used with the depicted motor 22, the cooling fan 28 could be used in connection with a wide range of motor configurations. For example, the shaft 56 of the rotor 32 preferably extends into and out of the housing 30, with the shaft 56 extending entirely through the rear bearing 68b. In alternative embodiments, the rotor shaft could be contained entirely within the motor chamber 66.

The illustrated cooling fan 28 is preferably mounted directly on the shaft 56. However, it will be appreciated that the cooling fan and rotor shaft could be interconnected by a transmission (not shown), such as a gear drive.

As noted previously, the motor assembly 20 preferably includes the controller 24 and the controller housing 26. The controller housing 26 includes a controller section 72a, a high-voltage section 72b, and a user interface section 72c. The controller section 72a preferably defines a controller chamber 74 that receives a printed circuit board 76 of the controller 24. In the usual manner, the controller 24 is preferably configured to at least in part control operation of the motor 22 (such as starting and stopping the motor, selecting rotational direction of the rotor, selecting and regulating speed, regulating or limiting torque, etc.). Furthermore, in a preferred embodiment, the controller 24 is positioned axially adjacent the motor 22.

The controller 24 preferably includes the printed circuit board 76 and a plurality of electronic components 78 (e.g., resistors, capacitors, inductors, transistors, processors, switches, etc.) mounted on the printed circuit board 76 (see FIG. 8). However, it is permissible for the controller 24 to be configured in any manner known in the art.

In a preferred embodiment, the printed circuit board 76 presents a geometric center that lies on or at least near the rotor axis A1. However, offset positioning is permissible according to some aspect of the present invention.

The controller section 72a preferably includes an endmost cover 80 and a generally axially extending sidewall 82. The sidewall 82 generally circumscribes the chamber 74, while the endmost cover 80 preferably at least substantially encloses an outer end of the chamber 74. The cover 80 and the sidewall 82 are preferably integrally formed. The cover 80 is preferably generally circular, and the sidewall 82 is preferably generally cylindrical. However, other cover and sidewall shapes are permissible within the scope of the present invention.

The controller 24 may be mounted in any suitable manner within the controller chamber 74. For instance, the controller 24 could be fastened to mounting bosses (not shown in detail) projecting from the cover 80 of the controller section 72a.

In a preferred embodiment, the controller chamber 74 and, in turn, the controller 24, is at least substantially encapsulated. Preferably, the shell 58, front endshield 60, and portions of the controller housing 26 cooperate to substantially seal the motor chamber 66 and the controller chamber 74. Furthermore, one or more gaskets (not shown) are preferably provided to restrict dust and water ingress into the controller chamber 74. However, within the ambit of certain aspects of the present invention, one or both of the chambers 66,74 may be vented to ambient. Wires (not shown) connecting the controller 24 and the motor 22 are preferably routed through a wire opening (not shown) in the endshield 62.

The controller housing 26 and the motor housing 30 are preferably at least substantially axially aligned. More particularly, in a preferred embodiment, the shell 58 of the motor housing 30 and the sidewall 82 of the controller housing 26 are at least substantially aligned.

It is also preferable that the controller chamber 74 and the motor chamber 66 present at least substantially equal internal diameters. More broadly, however, it is preferred that the controller chamber 74 and the motor chamber 66 present at least substantially equal radial or lateral dimensions (e.g., as would be the case for chambers having generally congruent oval or rectangular cross-sections).

Turning to FIGS. 7-12, the cooling fan 28 of the illustrated embodiment is configured to rotate with the shaft 56 to induce air flow within the motor housing 30 and the controller housing 26. In this manner, the cooling fan 28 promotes cooling of the controller 24, the rotor 32, the stator 34, and other components within the housings 26,30. As will be described, the cooling fan 28 includes a radially-projecting wheel plate and a plurality of radially extending blades.

As used herein, the terms "radial," "radially extending," "radially projecting," and other similar terms refer to a component having some radial dimension relative to an axis (in most, if not all, cases the rotational axis A1 of the shaft 56). It will be appreciated that these terms are not limited to a component, surface, or other feature that is defined purely along a radius.

Figure 12:
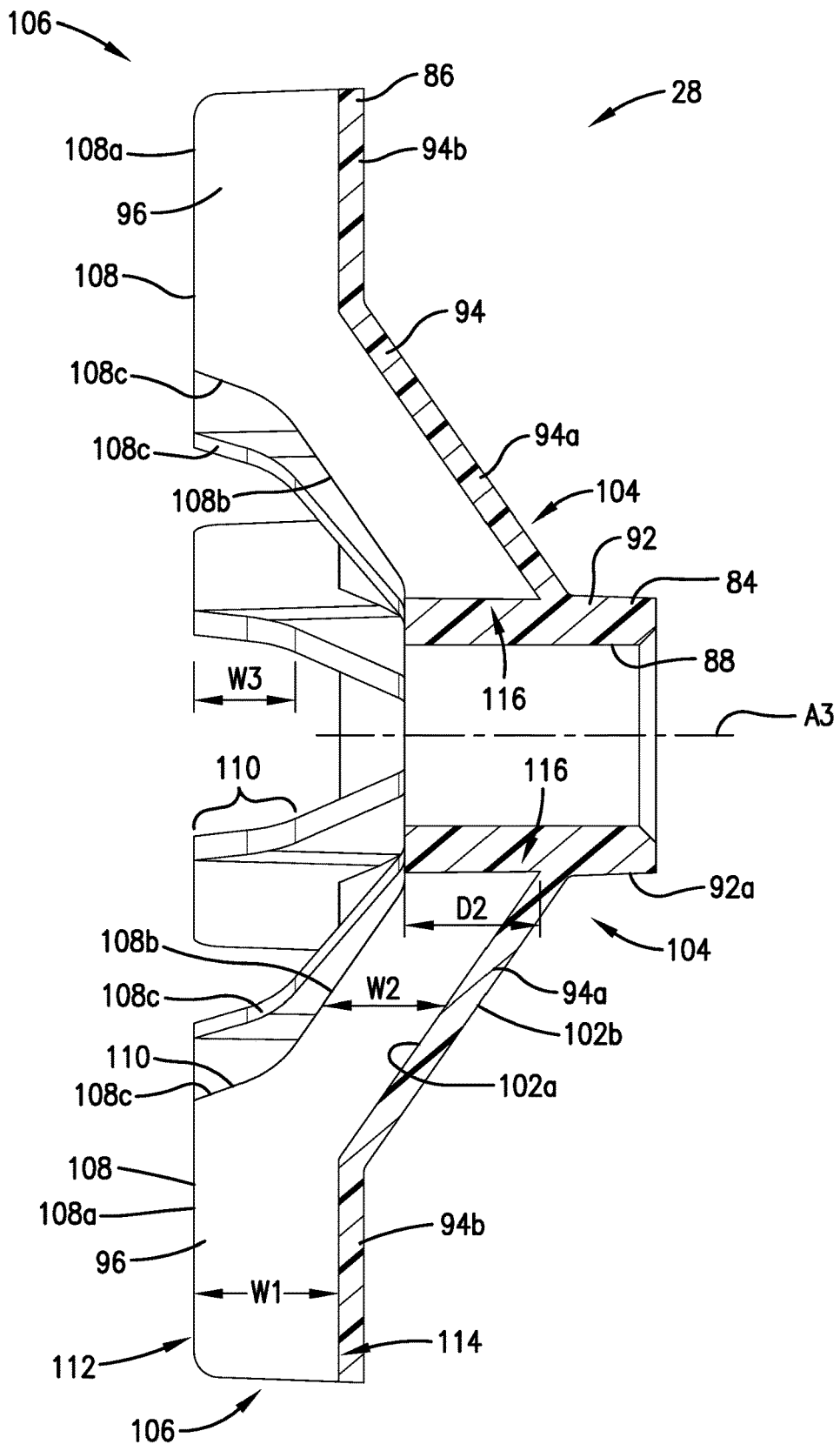
FIG. 12 is a cross section of the cooling fan taken along line 12-12 in FIG. 11.
Figure 14:
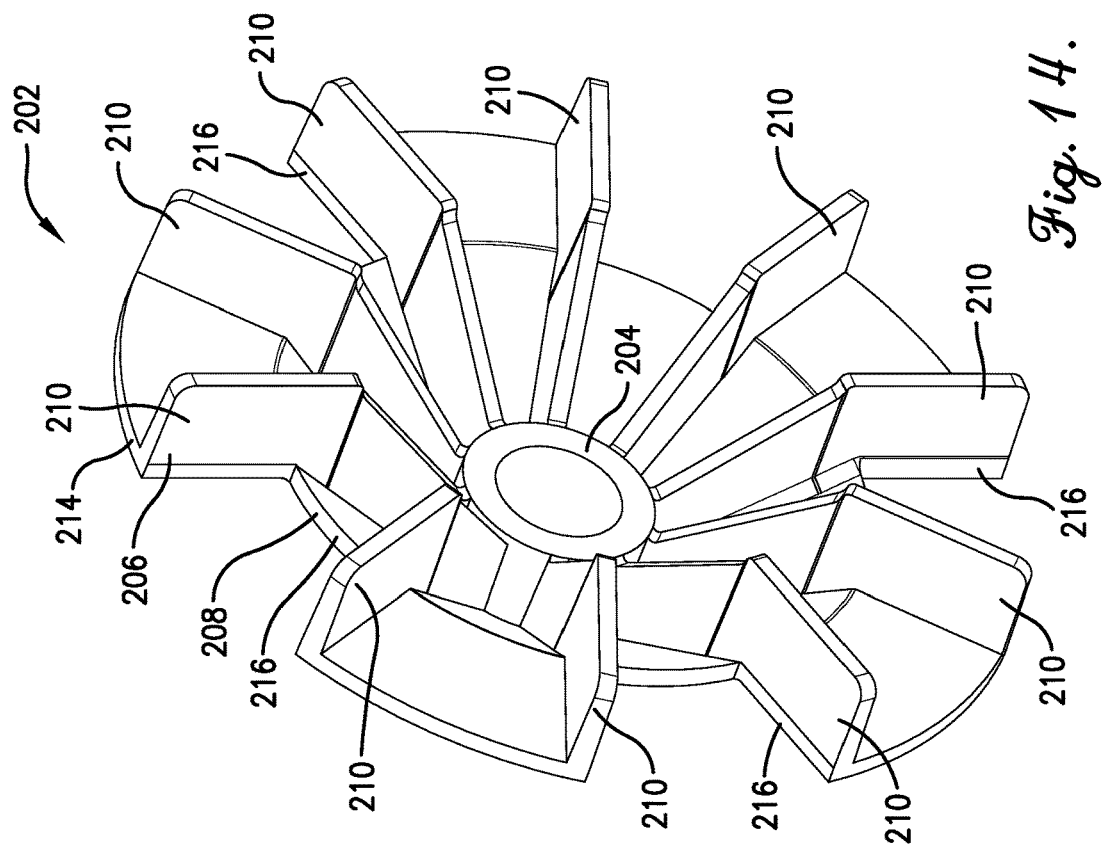
FIG. 14 is a perspective of the cooling fan shown in FIG. 13, but taken from the opposite side, showing a wheel plate and radially extending blades of the wheel.
Figure 13:
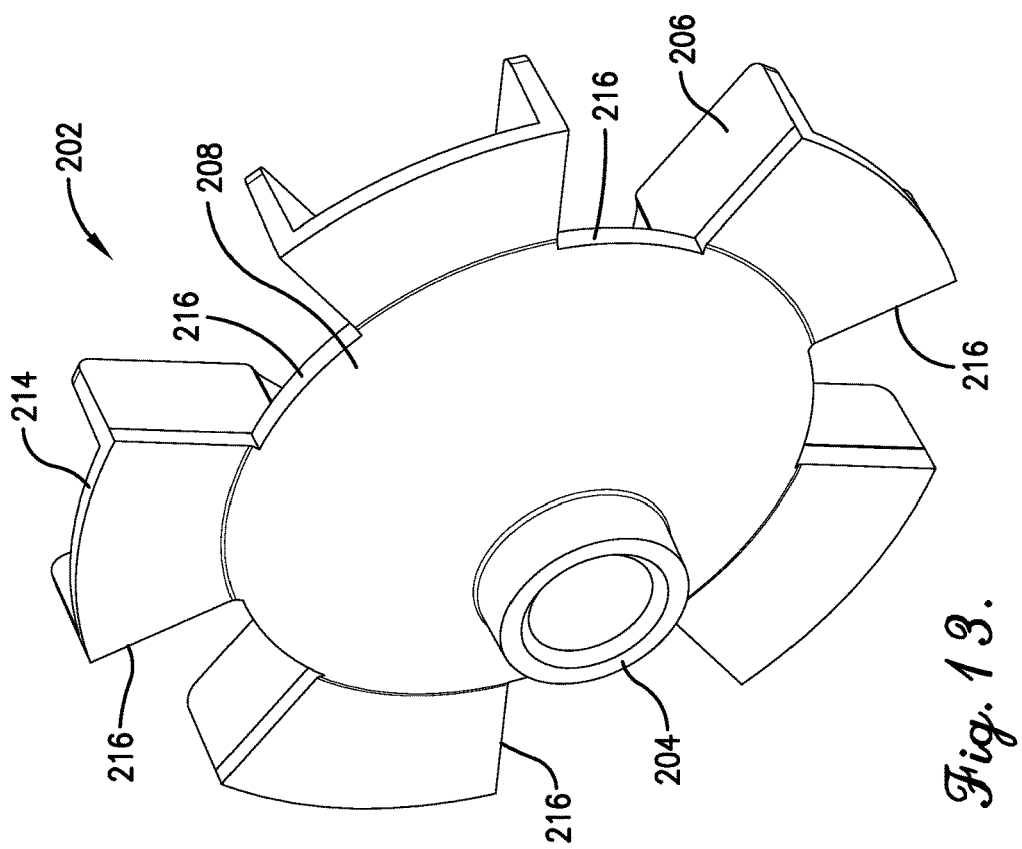
FIG. 13 is a perspective of a cooling fan constructed in accordance with a second preferred embodiment of the present invention, showing a hub and wheel of the alternative cooling fan.

The illustrated cooling fan 28 preferably includes a hub 84 and a wheel 86 and also presents a fan axis A3 about which the cooling fan 28 rotates (see FIG. 12). It will be appreciated that the fan axis A3 and the rotor axis A1 are substantially coaxial in the illustrated embodiment. However, for certain aspects of the present invention, the cooling fan 28 could be axially offset from the rotor axis A1 (e.g., where the rotor and cooling fan are drivingly connected by a transmission). In the usual manner, the hub 84 presents a shaft hole 88 receiving an end portion 90 of the shaft 56 when the fan 28 is mounted on the shaft 56 (see FIGS. 7 and 8).

The illustrated cooling fan 28 is fixed to the shaft 56 inside the motor housing 30 and is rotatable with the shaft 56. The cooling fan 28 is preferably located adjacent the rotor 32 and stator 34. Most preferably, the cooling fan 28 is fixedly attached directly to the shaft 56. Again, it is within the scope of the present invention where the cooling fan 28 is mounted on a shaft other than the rotor shaft (e.g., a transmission or output shaft). In such an alternative embodiment, it will be understood that the fan axis and the rotor axis could be coaxial or axially offset from one another (e.g., depending on the configuration of the transmission).

The illustrated hub 84 comprises a sleeve 92 that defines the shaft hole 88. Preferably, the shaft hole 88 extends continuously through the sleeve 92 and is defined by a smooth bore. In the preferred embodiment, the shaft hole 88 is sized and configured so that the shaft 56 is snugly received in the shaft hole 88. In the depicted embodiment, the cooling fan 28 is preferably frictionally engaged with the shaft 56 so as to be fixedly attached thereto (see FIG. 7). Furthermore, the shaft 56 projects outward in opposite directions relative to the sleeve 92 of hub 84.

However, it is within the scope of certain aspects of the present invention for the hub to be alternatively configured for driving attachment to the shaft. For instance, although the illustrated sleeve provides a smooth bore, the sleeve could have a profile shape that is keyed, splined, or otherwise has a non-circular shape for mating with a corresponding shape of the output shaft.

In various alternative embodiments, the hub sleeve could be alternatively fixed to the shaft, whether or not the shaft extends entirely through the hub. For instance, the sleeve could be secured to the shaft with one or more fasteners (e.g., a set screw, cotter pin, etc.). Also in alternative embodiments, the hub could be configured so that the shaft extends only partly through the hub or does not project from both ends of the hub. For at least certain aspects of the present invention, alternative embodiments of the cooling fan may not include a hub.

Figure 9:
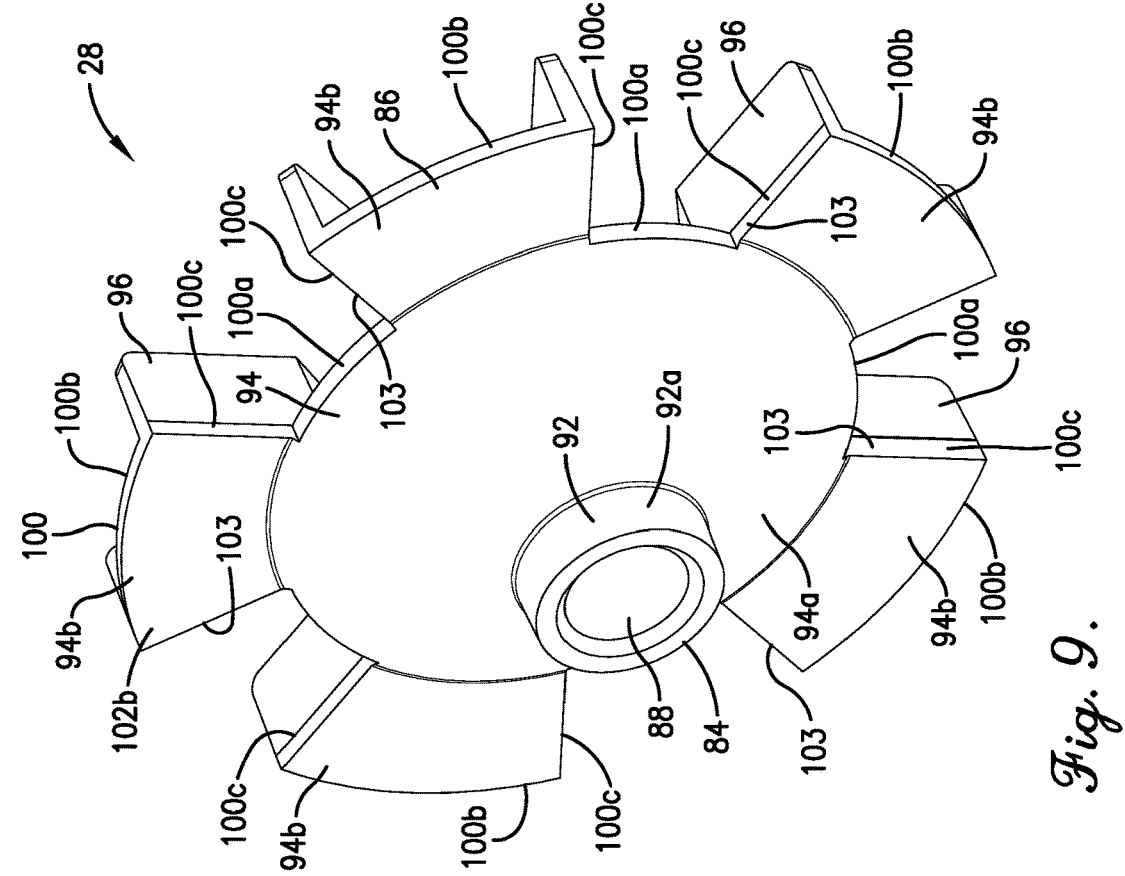
FIG. 9 is a perspective of the cooling fan shown in FIGS. 7 and 8, showing a hub and wheel of the cooling fan.

The sleeve 92 also presents an outer surface 92a (see FIGS. 9 and 12). As will be described below, the blades of the cooling fan 28 present radially inboard ends that intersect the hub and project from the outer surface 92a.

Turning to FIGS. 9-12, the illustrated wheel 86 preferably includes a radially-projecting wheel plate 94 and a plurality of radially extending blades 96. Preferably, the wheel plate 94 and blades 96 cooperatively form a series of radial open channels 98a and closed channels 98b (see FIG. 11). The channels 98a,98b extend radially outward relative to the hub 84 and relative to the shaft opening 62a.

The wheel plate 94 is supported by the hub 84 and located within the housing 30 when the motor 22 is secured for operation so that the shaft 56 extends through the shaft opening 62a. The depicted wheel plate 94 preferably projects radially relative to the shaft 56. The wheel plate 94 of the illustrated embodiment is preferably continuous and extends to an outer peripheral plate margin 100.

The peripheral plate margin 100 is spaced from and circumscribes the shaft 56. The peripheral plate margin 100 is cooperatively defined by inner and outer circumferential sections 100a,100b and radial sections 100c (see FIGS. 9-11). The circumferential sections 100a,100b of the plate margin 100 extend circumferentially along respective circular paths (see FIG. 11). The radial sections 100c generally extend radially relative to the wheel plate between the circumferential sections 100a,100b. As will be discussed, the sections 100a,100b,100c cooperatively define axial plate openings.

The depicted wheel plate 94 also preferably has a central plate section 94a and radially outer plate sections 94b (see FIG. 9). The central plate section 94a has a generally conical shape, while the outer plate sections 94b present a generally planar shape (see FIG. 12). Those of skill in the art will also appreciate that the wheel plate may be alternatively shaped without departing from the principles of the present invention. For example, instead of having a conical shape, the central plate section 94a could have a substantially flat shape.

Figure 10:
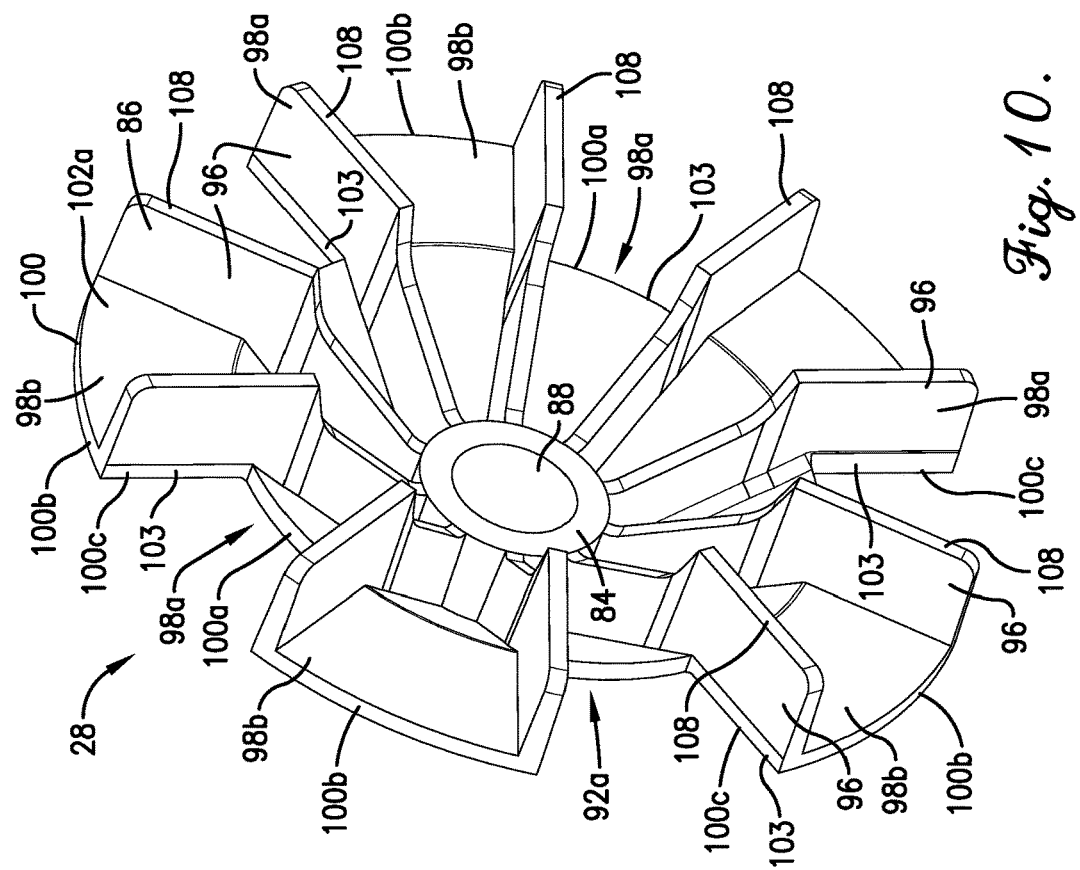
FIG. 10 is a perspective of the cooling fan shown in FIG. 9, but taken from the opposite side, showing a wheel plate and radially extending blades of the wheel.

The wheel plate 94 also presents inner and outer wheel surfaces 102a,b (see FIGS. 9, 10, and 12). In the depicted embodiment, the inner wheel surface 102a partly defines the channels 98 and facilitates diversion of air flow in a radially outward direction within the channels 98. As will be discussed further, the wheel plate 94 defines a series of axial plate openings 103.

For some aspects of the present invention, the wheel plate 94 could be alternatively constructed (e.g., where the wheel plate 94 is not continuous). The depicted wheel plate 94 is fixed to the hub 84 and is preferably positioned so that the center of the peripheral plate margin 100 corresponds to the fan axis A3. Again, it will be understood that parts of the wheel plate, such as the peripheral plate margin, may be alternatively shaped (e.g., to provide suitable fan performance).

In alternative wheel plate embodiments, the peripheral plate margin may be alternatively located relative to the fan axis. For instance, alternative plate margins may be off-axis relative to the fan axis, while circumscribing the shaft. Alternative plate margins may also have one or more circumferential and/or radial sections located radially inward and/or outward when compared to the depicted sections 100a,100b,100c. Although the depicted plate margin 100 presents a generally discontinuous circular shape, it will also be understood that alternative plate margins may be variously shaped.

Turning to FIGS. 9-12, the blades 96 define the channels 98 and facilitate air flow. In particular, the blades 96 facilitate air flow in a radially outward direction along the channels 98 and in an axial direction relative to the channels 98. The illustrated blades 96 are each unitary and present a radially inboard end 104, a radially outboard end 106, and a radially extending blade edge 108 that extends between the ends 104,106 (see FIG. 12).

The blades 96 preferably comprise a plate-like member having a substantially constant thickness. Furthermore, the depicted blades 96 have a generally flat shape that extends in alignment with the fan axis A3. The preferred flat blade shape permits the cooling fan 28 to direct air axially when spun in either rotational direction about the fan axis A3. For certain aspects of the present invention, the blades could also have a curved shape (e.g., to induce a greater flow of liquid).

The blade edges 108 each include a radially outboard edge section 108a and a radially inboard section 108b (see FIG. 12). The outboard edge section 108a is spaced radially outwardly from the inboard edge section 108b. The blade edge 108 also preferably includes a transition edge section 108c that extends between the outboard and inboard edge sections 108a,108b (see FIG. 12). The transition edge sections 108c cooperatively present a recessed shoulder 110 of the cooling fan 28 (see FIG. 12).

The blades 96 cooperatively define opposite forward and aft axial margins 112,114 of the cooling fan 28 (see FIG. 12). The forward axial margin 112 is defined by the blade edges 108 and is generally open. For certain aspects of the present invention, the forward axial margin 112 could be at least partly enclosed.

The aft axial margin 114 is defined along the wheel plate 94 and is partly enclosed by the wheel plate 94. The openings 103 correspond to parts of the aft axial margin 114 that are open. It is also within the scope of the present invention where the openings 103 are alternatively configured and/or positioned relative to the blades 96. When the blades 96 are fixed to the wheel plate 94, the peripheral margin 100 extends adjacent to the respective outboard ends 106 of the blades 96.

When the cooling fan 28 is installed, the blades 96 project axially from the wheel plate 94 in a direction toward the rear endshield 62. That is, the blades 96 generally extend from the inner wheel surface 102a toward the rear endshield 62. However, in alternative embodiments, at least part of the blades could extend axially from the wheel plate in a direction away from the rear endshield (or at least part of the blades could extend in both axial directions from the rear endshield). Again, the blades 96 cooperate with the wheel plate 94 to form the series of channels 98 extending radially outward relative to the shaft opening 62a.

The blades each preferably present a blade width dimension W1 along the outboard section and a blade width dimension W2 along the inboard section (see FIG. 12). The ratio of width dimension W2 to width dimension W1 preferably ranges from about 0.5/1 to about 1/1. More preferably, the ratio of width dimension W2 to width dimension W1 ranges from about 0.8/1 to about 1/1. The transition edge sections 108c preferably define a width dimension W3 that is less than the blade width dimension W1 (see FIG. 12).

The radially inboard ends 104 of blades 96 preferably intersect the hub 84. More specifically, in the illustrated embodiment, the radially inboard ends 104 of the blades 96 preferably project radially outward from the outer surface 92a of the sleeve 92. The inboard end 104 of each blade 94 intersects the hub 84 along an intersection region 116 (see FIG. 12). The region 116 has an axial length dimension D2 as measured from the inner plate surface 102a and along the sleeve outer surface 92a (see FIG. 8). The ratio of the axial length dimension D2 to the axial length of the hub 84 preferably ranges from about ten percent (10%) to about one hundred percent (100%) and, more preferably, is about fifty percent (50%). The ratio of the axial length dimension D2 to the axial length of the hub 84 is preferably configured so that the cooling fan 28 has desirable performance characteristics (for example, strength, weight, and/or efficiency).

As mentioned above, the sections 100a,b,c cooperatively define a series of axial plate openings 103 that extend axially through the wheel plate 94. The axial plate openings 103 each have an elongated curved shape, but could be alternatively shaped without departing from the scope of the present invention.

The depicted peripheral margin 100 defines the axial plate openings 103. It is also within the scope of the present invention where the axial plate openings are alternatively positioned along the wheel plate. For instance, the axial plate openings may be spaced radially inward from the peripheral plate margin.

The axial plate openings 103 are preferably defined between respective pairs of blades 96. In addition, the axial plate openings 103 are preferably in alignment with corresponding open channels 98a and fluidly communicate therewith. However, the depicted wheel plate 94 preferably spans each of the open channels 98a along part of the radial length of the channels 98a (see FIG. 11). In the depicted embodiment, the wheel plate 94 spans each adjacent pair of blades 96 associated with the open channels 98a, but extends only along a radially inner part of the channels 98a.

The axial plate openings 103 are preferably circumferentially spaced from the closed channels 98b. The depicted wheel plate 94 preferably spans each of the closed channels 98b along substantially the entire radial length of the channels 98b (see FIG. 11). That is, the wheel plate 94 spans each adjacent pair of blades 96 associated with the closed channels 98b. As a result, the wheel plate 94 is devoid of a plate opening in alignment with the closed channels 98b. In alternative embodiments, it will be understood that the wheel plate may have a plate opening in at least partial overlapping alignment with one or more closed channels.

The blades 96 presenting the closed channels 98b preferably have radially outboard ends 106 that do not extend beyond the peripheral margin 100. In various alternative embodiments, it will be appreciated that the blades presenting the closed channels may extend so that the radially outboard ends are radially inboard or radially outboard of the peripheral margin.

The depicted open and closed channels 98a,98b are preferably ordered in an alternating arrangement in a circumferential direction. In other words, the axial plate openings 103 are preferably intercalated between pairs of adjacent closed channels 98b. As depicted, the cooling fan 28 also preferably includes an equal number of open channels 98a and closed channels 98b, each presented by a respective pair of blades 96.

Consistent with the principles of the present invention, the open and closed channels could have an alternative arrangement. For example, two or more open channels could be arranged consecutively in the circumferential direction. Similarly, two or more closed channels could be arranged consecutively in the circumferential direction. For certain aspects of the present invention, the cooling fan 28 could be devoid of closed channels such that the cooling fan 28 only includes a series of open channels.

The cooling fan 28 preferably comprises a synthetic resin material, such as an elastomeric material. It is equally within the ambit of the present invention where the fan includes, alternatively or additionally, one or more other materials. For instance, the fan could include one or more metallic materials (e.g., carbon steel, stainless steel, and/or aluminum).

The illustrated embodiment of the cooling fan 28 preferably comprises a one-piece construction. However, for some aspects of the present invention, the fan could include multiple components that are attached to one another (e.g., where the components are welded, adhered, fastened, and/or otherwise secured to one another).

Turning to FIGS. 5-7, the depicted cooling fan 28 is mounted on the shaft 56 to direct air through the openings 64. During operation, as will be discussed further below, the cooling fan 28 spins with the shaft 56 to move air between the motor chamber 66 and the controller chamber 74.

The outboard section 108a and the rear endshield 62 cooperatively define a minimum axial spacing dimension D3 (see FIG. 8) to provide suitable clearance between the rear endshield 62 and the blades 96.

The cooling fan 28 is preferably located adjacent the rotor 32 and stator 34. The axial plate openings 103 are located adjacent the stator 34 and radially overlap the stator 34. In this manner, air can pass through the axial plate openings 103 between the stator 34 and the rear endshield 62.

Again, the endshield openings 64 permit the motor housing 30 and the controller housing 26 to fluidly communicate with each other. The cooling fan 28 and the rear endshield 62 are preferably positioned and configured so that the axial plate openings 103 radially overlap the endshield openings 64. As a result, the axial plate openings 103 overlap the endshield openings 64 as the cooling fan 28 spins about the fan axis A3. That is, each axial plate opening 103 is configured to move into and out of alignment with each of the endshield openings 64 as the cooling fan is spun about the fan axis A3. The endshield openings 64 and the axial plate openings 103 preferably cooperate so that the cooling fan 28 can induce a cooling air flow between the motor chamber 66 and the controller chamber 74.

In use, the cooling fan 28 is preferably used as part of the motor assembly 20 to move air between the motor chamber 66 and the controller chamber 74. More specifically, the cooling fan 28 spins with the shaft 56 about the fan axis A3 to move air between the chambers 66,74.

As the cooling fan 28 spins about the fan axis A3, air within the channels 98 is urged to move radially outwardly by the cooling fan 28. It will be appreciated that the blades 94 primarily urge air in the channels 98 to move radially outwardly, although the wheel plate 94 also urges radially outward movement of air.

Furthermore, air positioned outside of the channels 98 but between the cooling fan 28 and the rear endshield 62 can also be induced by the cooling fan 28 to move radially outwardly as the cooling fan 28 spins with the shaft 56. It will also be understood that air may pass into and/or out of the channels 98 as the air advances radially outward from a location between the cooling fan 28 and rear endshield 62.

As the cooling fan 28 spins about the fan axis A3 and moves air radially, it will also be understood that air is induced to move axially between the chambers 66,74. For instance, the cooling fan 28 position and configuration generally induces air flow from the motor chamber 66 to the controller chamber 74. At the same time, the cooling fan 28 also induces air flow in the opposite direction, from the controller chamber 74 to the motor chamber 66. The position and configuration of the axial plate openings 103 has been found to particularly facilitate air flow from adjacent the rear endshield toward the front endshield 60. Again, it will be appreciated that the blades 94 primarily urge air to move radially, although the wheel plate 94 also urges some axial movement of air.

Turning to FIGS. 13-16, an alternative cooling fan 202 is constructed in accordance with a second embodiment of the present invention. For the sake of brevity, the remaining description will focus primarily on the differences of this alternative embodiment from the preferred embodiment described above. The cooling fan 202 preferably includes a hub 204 and an alternative wheel 206.

The wheel 206 preferably includes a wheel plate 208 and a plurality of alternative blades 210. The wheel plate 208 and blades 210 cooperatively form a series of radially-extending open channels 212a and closed channels 212b (see FIG. 15). The wheel plate 208 is preferably continuous and extends to an outer peripheral plate margin 214. The wheel plate 208 also defines a series of axial plate openings 216.

Figure 16:
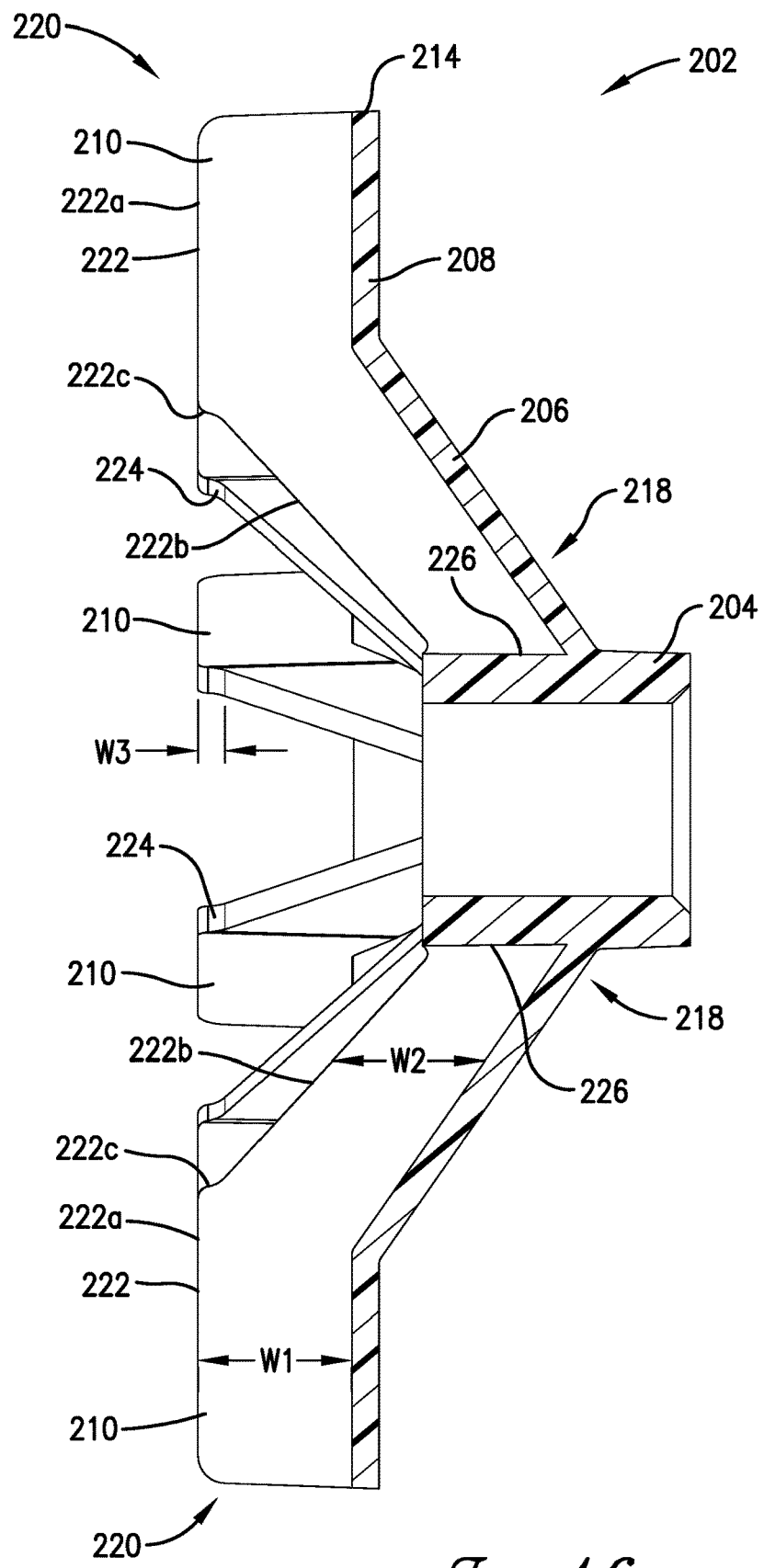
FIG. 16 is a cross section of the cooling fan taken along line 16-16 in FIG. 15.

Turning to FIGS. 15 and 16, the blades 210 define the channels 212 and facilitate air flow. In particular, the blades 210 facilitate air flow in a radially outward direction along the channels 212 and in an axial direction relative to the channels 212. The illustrated blades 210 are each unitary and present an inboard end 218, an outboard end 220, and a radially extending blade edge 222 that extends between the ends 218,220 (see FIG. 16).

The blade edges 222 each include a radially outboard edge section 222a and a radially inboard section 222b (see FIG. 16). The outboard edge section 222a is spaced radially outwardly from the inboard edge section 222b. The blade edge 222 also preferably includes a transition edge section 222c that extends between the outboard and inboard edge sections 222a,222b (see FIG. 16). The transition edge sections 222c cooperatively present a recessed shoulder 224 of the cooling fan 202 (see FIG. 16).

The blades 210 each preferably present a blade width dimension W1 along the outboard section 222a and a blade width dimension W2 along the inboard section 222b (see FIG. 16). The width dimension W2 of the inboard section 222b decreases in a direction toward the inboard end 218, whereas the blade width dimension W2 of the blade 96 is generally constant along most of the length of the inboard section 108b.

The transition edge sections 222c preferably define a width dimension W3 that is at least half the length of the blade width dimension W1 (see FIG. 16). The width dimension W3 of the blade 210 is more than twice as long as the width dimension W3 of the blade 96. The radially inboard ends 218 of the blades 210 preferably intersects the hub 84 along an intersection region 226 (see FIG. 16).

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. An electric motor assembly comprising:
a stator;
a rotor rotatable relative to the stator;
a housing in which the stator and rotor are at least partly housed;
a rotatable shaft associated with the rotor to rotate about an axis;
a cooling fan within the housing,
said cooling fan being fixed to and thereby rotating with the shaft to induce airflow within the housing,
said cooling fan including a wheel plate projecting radially relative to the shaft,
said cooling fan including a plurality of radial blades that project axially from the wheel plate,
said blades defining a series of radial channels,
said wheel plate defining an axial plate opening therethrough in alignment with a respective one of the channels,
each of said channels being defined between a corresponding adjacent pair of the blades,
said plate opening being defined between a first pair of the blades corresponding with the respective one of the channels; and
a second pair of said blades presenting a closed one of the channels, with the wheel plate spanning and being devoid of a plate opening in alignment with the closed one of the channels.

2. The electric motor assembly as claimed in claim 1,
said wheel plate presenting a peripheral plate margin spaced from and circumscribing the shaft, said second pair of said blades presenting radially outboard ends that do not project beyond the peripheral margin.

3. The electric motor assembly as claimed in claim 2,
said plate margin at least partly defining the plate opening.

4. The electric motor assembly as claimed in claim 3,
said plate margin having a discontinuous circular shape.

5. An electric motor assembly comprising:
a stator;
a rotor rotatable relative to the stator;
a housing in which the stator and rotor are at least partly housed;
a rotatable shaft associated with the rotor to rotate about an axis; and
a cooling fan within the housing,
said cooling fan being fixed to and thereby rotating with the shaft to induce airflow within the housing,
said cooling fan including a wheel plate projecting radially relative to the shaft,
said cooling fan including a plurality of radial blades that project axially from the wheel plate,
said blades defining a series of radial channels,
said wheel plate defining an axial plate opening therethrough in alignment with a respective one of the channels,
each of said channels being defined between a corresponding adjacent pair of the blades,
said wheel plate defining a plurality of axial plate openings, each being aligned with respective channels of first pairs of the blades,
second pairs of said blades presenting closed one of the channels, with the wheel plate spanning and being devoid of a plate opening in alignment with the closed ones of the channels.

6. The electric motor assembly as claimed in claim 5,
said first and second pairs of blades circumferentially alternating in series about the shaft.

7. The electric motor assembly as claimed in claim 6,
said wheel plate presenting a peripheral plate margin spaced from and circumscribing the shaft,
said plate margin at least partly defining the plate opening.

8. The electric motor assembly as claimed in claim 6,
said cooling fan including an equal number of first pairs of blades and second pairs of blades.

9. An electric motor assembly comprising:
a stator;
a rotor rotatable relative to the stator;
a housing in which the stator and rotor are at least partly housed;
a rotatable shaft associated with the rotor to rotate about an axis; and
a cooling fan within the housing,
said cooling fan being fixed to and thereby rotating with the shaft to induce airflow within the housing,
said cooling fan including a wheel plate projecting radially relative to the shaft,
said cooling fan including a plurality of radial blades that project axially from the wheel plate,
said blades defining a series of radial channels,
said wheel plate defining an axial plate opening therethrough in alignment with a respective one of the channels,
said blades cooperatively presenting opposite axial margins of the cooling fan, with the wheel plate at least partly enclosing one of the axial margins and the other axial margin being open.

10. The electric motor assembly as claimed in claim 9,
said cooling fan including a hub adjacent the shaft,
said wheel plate and said blades projecting radially outward from the hub.

11. The electric motor assembly as claimed in claim 9,
said rotor including the shaft, a rotor core fixed to the shaft, and a plurality of circumferentially arranged magnets supported on rotor core.

12. The electric motor assembly as claimed in claim 9,
said wheel plate presenting a peripheral plate margin spaced from and circumscribing the shaft, with the plate margin at least partly defining the plate opening.

13. The electric motor assembly as claimed in claim 12,
each of said blades presenting a radially outboard end,
said plate margin extending adjacent to at least one of the outboard ends.

14. The electric motor assembly as claimed in claim 9,
each of said channels being defined between a corresponding adjacent pair of the blades,
said plate opening being defined between a first pair of the blades corresponding with the respective one of the channels.

15. The electric motor assembly as claimed in claim 9,
each of said channels being defined between a corresponding adjacent pair of the blades,
said wheel plate defining a plurality of axial plate openings, each being aligned with respective channels of first pairs of the blades.

16. The electric motor assembly as claimed in claim 9,
each of said blades being flat so that the cooling fan is configured to induce air flow when spun in either one of opposite rotational directions.

17. The electric motor assembly as claimed in claim 9,
said housing presenting a motor housing chamber,
said housing including a spoked endshield that presents an endshield opening in fluid communication with the motor housing chamber,
said cooling fan being positioned adjacent the endshield to induce air flow through the endshield opening.

18. An electric motor assembly comprising:
a stator;
a rotor rotatable relative to the stator;
a housing in which the stator and rotor are at least partly housed;
a rotatable shaft associated with the rotor to rotate about an axis;
a cooling fan within the housing,
said cooling fan being fixed to and thereby rotating with the shaft to induce airflow within the housing,
said cooling fan including a wheel plate projecting radially relative to the shaft,
said cooling fan including a plurality of radial blades that project axially from the wheel plate,
said blades defining a series of radial channels,
said wheel plate defining an axial plate opening therethrough in alignment with a respective one of the channels,
said housing presenting a motor housing chamber,
said housing including a spoked endshield that presents an endshield opening in fluid communication with the motor housing chamber,
said cooling fan being positioned adjacent the endshield to induce air flow through the endshield opening; and
a controller housing attached relative to the spoked endshield, with the controller housing and the spoked endshield defining a controller chamber;
a controller operably received in the controller chamber, said cooling fan being configured to induce air flow within the motor housing chamber and the controller chamber.

19. The electric motor assembly as claimed in claim 18,
said blades cooperatively presenting opposite axial margins of the cooling fan, with the wheel plate at least partly enclosing one of the axial margins and the other axial margin being open,
said cooling fan being positioned such that the open axial margin of the cooling fan is adjacent to the endshield.

* * * * *